United States Patent
Lepere et al.

(10) Patent No.: US 8,139,203 B2
(45) Date of Patent: *Mar. 20, 2012

(54) METHOD OF SCANNING A SCENE AND CORRESPONDING SCANNING DEVICE

(75) Inventors: Grégory Lepere, Sevran (FR); Pascal Souffez, Paris (FR)

(73) Assignee: Trimble AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,617

(22) Filed: Aug. 24, 2009

(65) Prior Publication Data

US 2010/0066993 A1    Mar. 18, 2010

Related U.S. Application Data

(63) Continuation of application No. 11/392,029, filed on Mar. 29, 2006, now Pat. No. 7,583,365.

(51) Int. Cl.
*G01C 3/08* (2006.01)

(52) U.S. Cl. ............ 356/4.01; 356/3.01; 356/3.15; 356/4.1; 356/5.01; 356/5.15

(58) Field of Classification Search ............ 356/4.01, 356/3.01–3.15, 4.01–4.1, 5.01–5.15, 6–22
See application file for complete search history.

(56) References Cited

U.S. PATENT DOCUMENTS

| 5,638,164 | A | 6/1997 | Landau |
| 6,847,462 | B1 | 1/2005 | Kacyra et al. |
| 2002/0131056 | A1 | 9/2002 | Fujii et al. |
| 2003/0043386 | A1 | 3/2003 | Froehlich et al. |
| 2005/0057741 | A1* | 3/2005 | Anderson et al. ............ 356/5.01 |

OTHER PUBLICATIONS

First Office Action of corresponding Chinese Patent Application No. 2007 80012456.8 including the Notification, and an English-language translation of the First Office Action.

* cited by examiner

*Primary Examiner* — Thomas Tarcza
*Assistant Examiner* — Luke Ratcliffe
(74) *Attorney, Agent, or Firm* — Cooper & Dunham LLP

(57) ABSTRACT

The present invention provides devices and methods for multi-dimensional scanning of a scene. In particular, this invention provides scanning devices and methods employing controllable light beam scanning devices capable of sending a light beam onto a scene, and of receiving corresponding light returned from the scene, and controllers capable of operating the scanning device at selected beam orientations, and of gaining distance information from the scanning device at the beam orientations. The controller can dynamically define beam orientations using the distance information gained from preceding beam orientations.

28 Claims, 7 Drawing Sheets

METHOD OF SCANNING A SCENE AND CORRESPONDING SCANNING DEVICE

CROSS REFERENCE TO RELATED APPLICATIONS

This application is a continuation of U.S. application Ser. No. 11/392,029 filed Mar. 29, 2006 now U.S. Pat. No. 7,583,365 the entire contents of which are incorporated herein by reference.

BACKGROUND OF THE INVENTION

The present invention is concerned with multi-dimensional scanning of a scene.

In industrial production environments, most installations and machineries are built according to plans. However, those installations and machineries tend to require upgrading over time and/or are subject to additions which may or may not be appropriately documented.

For certain applications, such as offshore platforms for instance, it is necessary when adding an additional element to be sure that it will fit in the existing installation. Other applications include scanning existing permanent structures for upgrading and/or control when no plans are readily available.

Thus, methods and apparatuses have been proposed to try and obtain "as-built" plans of these structures. Most recently, solutions involving laser digitizing apparatuses have been proposed.

Practically, those solutions imply projecting a scanning laser beam on an installation being captured. At each laser orientation, the distance is derived from the time or the phase difference in the laser to-and-fro path to a reflecting point. After suitably scanning the scene, this results in a three-dimensional set of points, also referred to as "cloud of points", corresponding to the installation.

The scanning of the scene is usually performed as a method, which comprises:
 taking a picture of the scene, selecting a scene portion to be scanned and corresponding scanning information;
 scanning the scene portion according to the selected scanning information.

When performing such a method, the desired scanning resolution defines the scanning time, and the size of the resulting data, and, accordingly, the needs in terms of hardware and software capabilities.

The applicant company has observed that this may not be entirely satisfactory in all circumstances, at it will be explained hereinafter in more details.

BRIEF SUMMARY OF THE INVENTION

The invention aims at improving the situation.

The invention proposes a method of scanning a scene, said method comprising:
 a. sending a light beam to the scene according to a beam orientation, and gaining distance information from the return of said light beam,
 b. selectively repeating step a. with a plurality of other beam orientations, wherein step b, comprises
 b1. after one or more repetitions of step a., defining the next beam orientation using distance information gained at one or more preceding beam orientations.

Such a method of scanning a scene makes it possible to adjust the scanning resolution in order to better image the scene. This method enables having a substantially constant density of scan points in terms of space spread. This means that scenes requiring a given resolution regardless of the difference in distance to the points being scanned can be acquired in a reduced time. The post-processing time is also consequently diminished since cloud resulting from the scanning contains less points than a conventional method which would use constant resolution.

Such a method of scanning a scene makes it possible to recognize some interesting areas of the scene such as edges. Then, locally and when deemed appropriate, the scanning resolution may be adjusted in order to better image interesting details of the scene. The time of acquisition is thus minimized compared to a classic method, for a similar scanning quality. The post-processing time is also consequently diminished since cloud resulting from the scanning contains less points.

An scanning device, is also proposed, comprising:
 a controllable light beam scanning device capable of scanning a light beam onto a scene, and of receiving corresponding light returns from the scene,
 a controller capable of operating said scanning device at selected beam orientations, and gaining distance information from said scanning device at said beam orientations, wherein the controller is further capable of dynamically defining a further beam orientation using distance information gained at preceding beam orientations.

This invention also encompasses software code, adapted to execute the steps of the above method. It further encompasses software code, adapted to implement the controller of the above device.

BRIEF DESCRIPTION OF THE SEVERAL VIEWS OF THE DRAWINGS

Other alternative features and advantages of the invention will appear in the detailed description below and in the appending drawings, on which.

These drawings form an integral part of the description of the present invention, and may serve by themselves to support features of the invention.

DETAILED DESCRIPTION OF THE INVENTION

Now, making reference to software entities imposes certain conventions in notation. For example, in the detailed description, the quote sign " and/or Italics may be used when deemed necessary for clarity, e.g. to distinguish between natural language and a software entity. Generally:
 a software entity which starts with the symbol "$", is a variable, a data object or a data structure;

it may be an array, or an equivalent data structure, if it terminates with a bracket expression, e.g. $Ang(k);

a software entity which does not start with the symbol "$", but terminates with a bracket expression, e.g. Distance( ), is generally a procedure or function;

optionally, a procedure or function may be called with one or more arguments (parameters) indicated within the round brackets, e.g. Distance($Ang(k));

undefined data are generally shown in italics.

Also, the references, to functions, and the function names, are for convenience only. They do not imply the use of software code whose structure matches the functions as described hereinafter.

Figure 1:
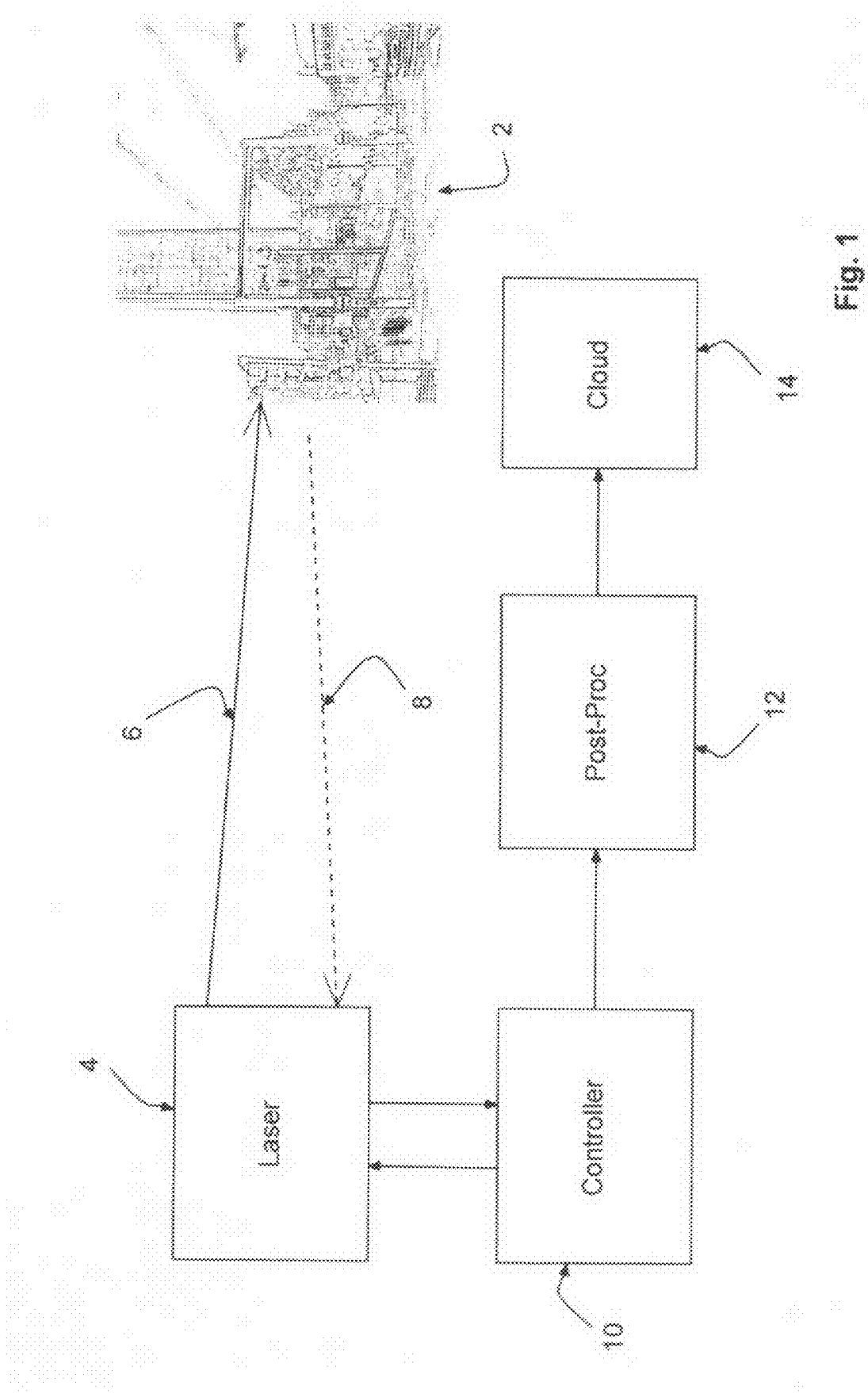
FIG. 1 shows a block diagram of an exemplary scanning device.

As seen on FIG. 1, a scene 2 is scanned by means of a controllable scanning laser device comprising a laser 4.

Laser 4 projects a beam 6 at a set of laser orientations, and, at each of those orientations, the distance to the scene is derived from the time or the phase difference between the beam 6 and a reflected beam 8.

The laser orientations may be transmitted to the laser 4 by a controller 10. Controller 10 may select those orientations according to a method which will be described further below.

Once scene 2 has been scanned, controller 10 may transmit the distances and laser orientations to a post processing unit 12. The post processing unit 12 may combine the distances with the laser orientations to define points of a cloud 14 of points representing the scene 2.

Figure 2:
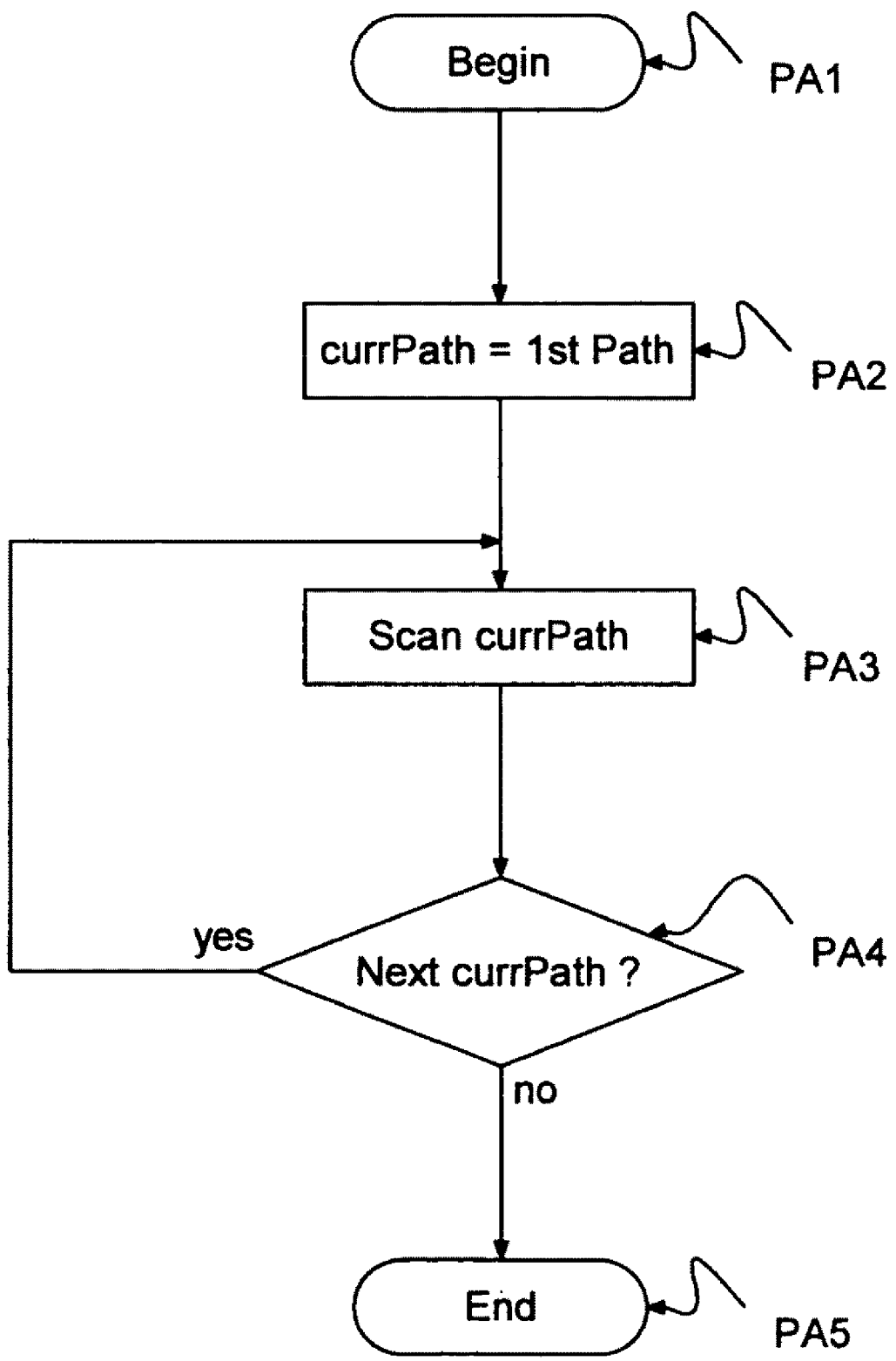
FIG. 2 shows an exemplary flowchart of a known method of scanning a scene.

FIG. 2 shows a known method of scanning a scene. This method comprises the following steps:

PA1. initiating the laser orientation controlling program.

PA2. initiating a scanning path currPath with a path 1st Path.

PA3. scanning the path currPath, i.e. measuring the distance to the scene at every laser orientation, each laser orientation being derived from the previous one according to the path currPath and the angle step.

PA4. if there is a path left, repeating step PA3, else

PA5. transmitting the data to the post processing unit 12.

This simple method will return a cloud, the level of details of which depends on the scanning resolution, i.e. the smaller the angle step, the higher the resolution.

Until now, a constant scanning resolution is being used. This means that a choice has to be made regarding the tradeoff level of details/scanning time, that is basically defined by the angular step between the orientations.

In scenes showing a large depth, this scanning resolution also leads to an uneven spatial resolution. By spatial resolution, the applicant refers to the average distance, in space, between the points that are scanned. As a consequence of a constant scanning resolution, two scanned points in the depth of the scene are a lot more distant to each other than two scanned points close to the laser. In the scanning of a road or of a tunnel, this means that several scannings have to be performed to maintain constant spatial resolution over the scene.

Moreover, in certain applications, high level of details is required, and thus the scanning resolution has to be as high as possible. This means that a scene presenting several important details, but mostly uniform for the rest, is scanned with a maximum resolution, although it is unnecessary for most of the scene. This represents a waste of time and resources.

Further, when an excessive resolution is used, the cloud of points obtained contains a lot of "useless" points. This either tends to slow down the post-processing of the cloud, or necessitates a preliminary step for cleaning out redundant data before the post-processing.

Thus, not only do classic methods take unnecessary time for acquiring the cloud, but they also lengthen its post-processing.

In general the paths are scanned from bottom to ceiling, that is the paths are vertical, and start from the ground (or a given angle) on up. Other embodiments are possible.

Assume that a given angular step is being used. Then, considering two consecutive laser orientations on the laser scanning path, the corresponding laser beams will hit two different points of the scene, and the actual spacing between these two points is related to the angular resolution and to their distances to the laser source.

If those two points belong to a surface substantially orthogonal to the direction of the laser beam, then the difference in the distance gained at those points will be rather small, and other points gained on this surface will all be at a given distance from each other.

However, if the surface is somewhat parallel with the laser direction, i.e. shows some depth, then the distance between points gained on this surface will substantially grow as "deeper" points are scanned. This means for instance that a road being scanned will show a lot of points close to the scanning device and then will progressively capture less and less points as the scanning is performed on further points.

The applicant has concluded that a better overall quality may be reached by predicting where a next scanning point may be in order to reach a substantially constant spatial resolution, and by deducing the orientation for scanning this point from the previous ones.

The applicant has also observed that, in some situations, the respective laser returns at two laser orientations will show significantly different distances to the scene. This is called here a "discontinuity" in a part of the scene, as observed. In fact, a discontinuity will be associated to the two or more laser orientations at which it is detected, and/or to a portion or segment of the scanning path which encompasses the said two or more laser orientations.

The applicant has concluded that a better spatial resolution may be desired where such differences in distance or "discontinuities" are met. This makes it possible to detect edges of portions of a scene, as well as other interesting points of this scene, such as curvature zones.

Thus, the whole scene may be scanned with an attempted "average" resolution, corresponding to a desired spatial resolution for the scene. Then, a better resolution may be used where "discontinuities" are detected. The search for discontinuities is used extensively in the methods described below. It allows to ameliorate the spatial resolution repartition.

The applicant thus proposes a new method of scanning wherein the scanning is organized in scan lines or scan paths, at a lateral angular deviation from each other.

Figure 3:
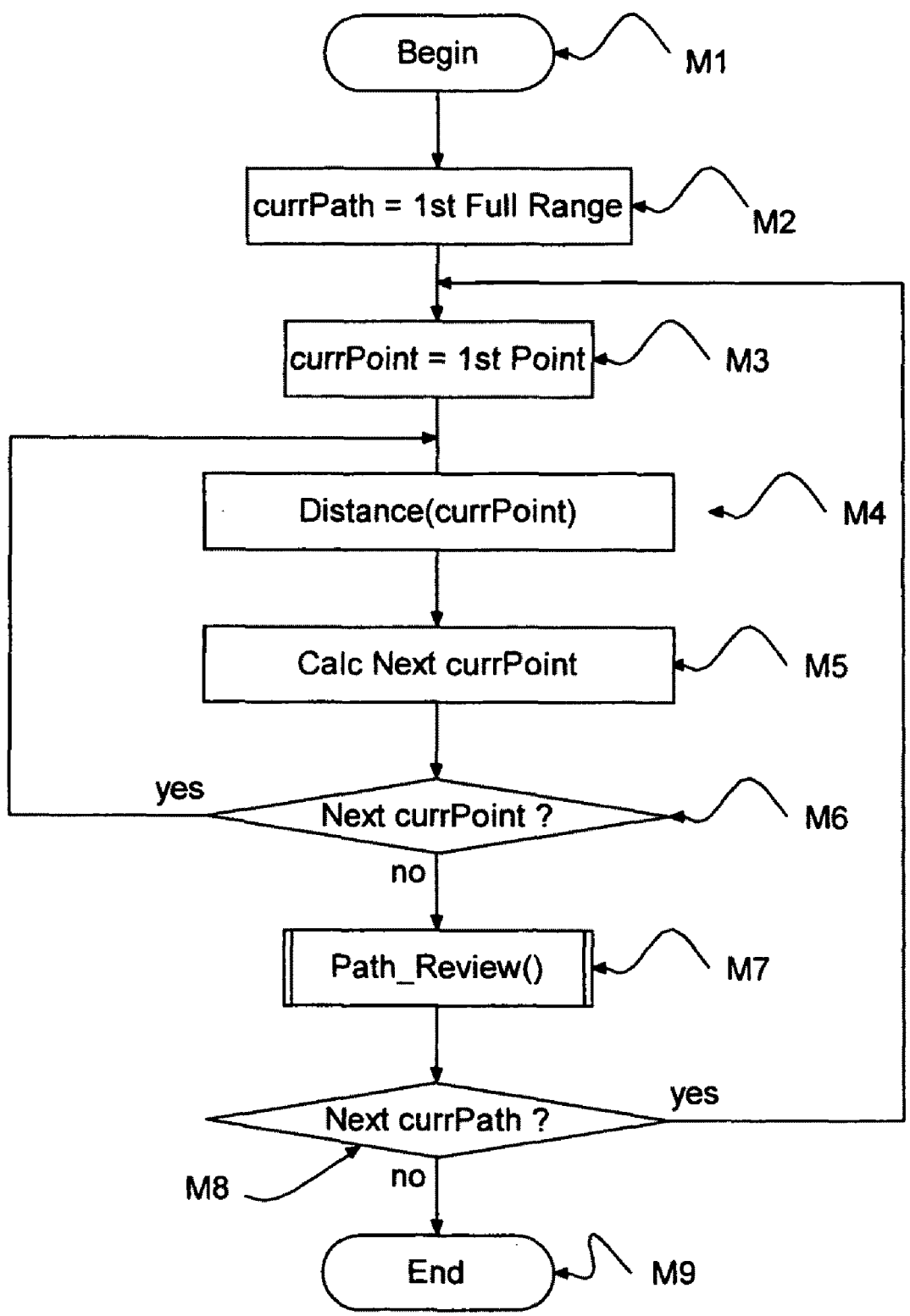
FIG. 3 shows an exemplary flowchart of a method of scanning a scene.

FIG. 3 shows an exemplary flowchart of a first method of scanning a scene. It may comprise the following operations:

M1. an initialization operation in which scanning parameters may be set as mentioned above, e.g. the spatial scanning resolution searched for and a first path.

M2. a variable currPath which designates a scanning path may be initiated. It may contain data representing the first path determined in operation M1.

M3. a variable currPoint may be initiated. It may contain data representing the first a point of currPath aimed at by the laser at a starting orientation.

M4. a function Distance( ) may use the laser orientation defining currPoint as an argument and determine the distance from the laser to the scene, to define a scanning point.

M5. the next point may be calculated from the preceding point(s), that is from the orientations of the laser and the corresponding scanning points. A beam orientation is thus obtained, which is supposed to aim at a point at a distance from its neighbors in correspondence with the spacing resolution.

M6. the calculated beam orientation may be checked for validity.

If the calculated beam orientation is within the scene, steps M4 to M6 may be repeated with further calculated laser orientations.

Else,

M7. a scanning path has been scanned, and it may be analyzed with a function Path_Review( ), which will be explained in more detail further below.

M8. a check may be made to see if there is a scanning path not yet scanned.

If so, variable currPath may be updated with data representing this path, according to a method which will be described in more detail below, and the scanning may be repeated with operation M3, with the new value of currPath.

Else,

M9. the results may be transmitted to the post processing unit 12.

As apparent from this flowchart, this method comprises two loops intertwined:

a "local" loop scans the scene along a scanning path, by calculating beam orientations from previously obtained data, in order to reach a given spatial resolution, and may further improve the results with a review.

a "global" loop selectively repeats the local loop until there are no more paths for the scanning of the scene.

Loops and functions of this method will be described in more detail with FIGS. 4 to 7.

Figure 4:
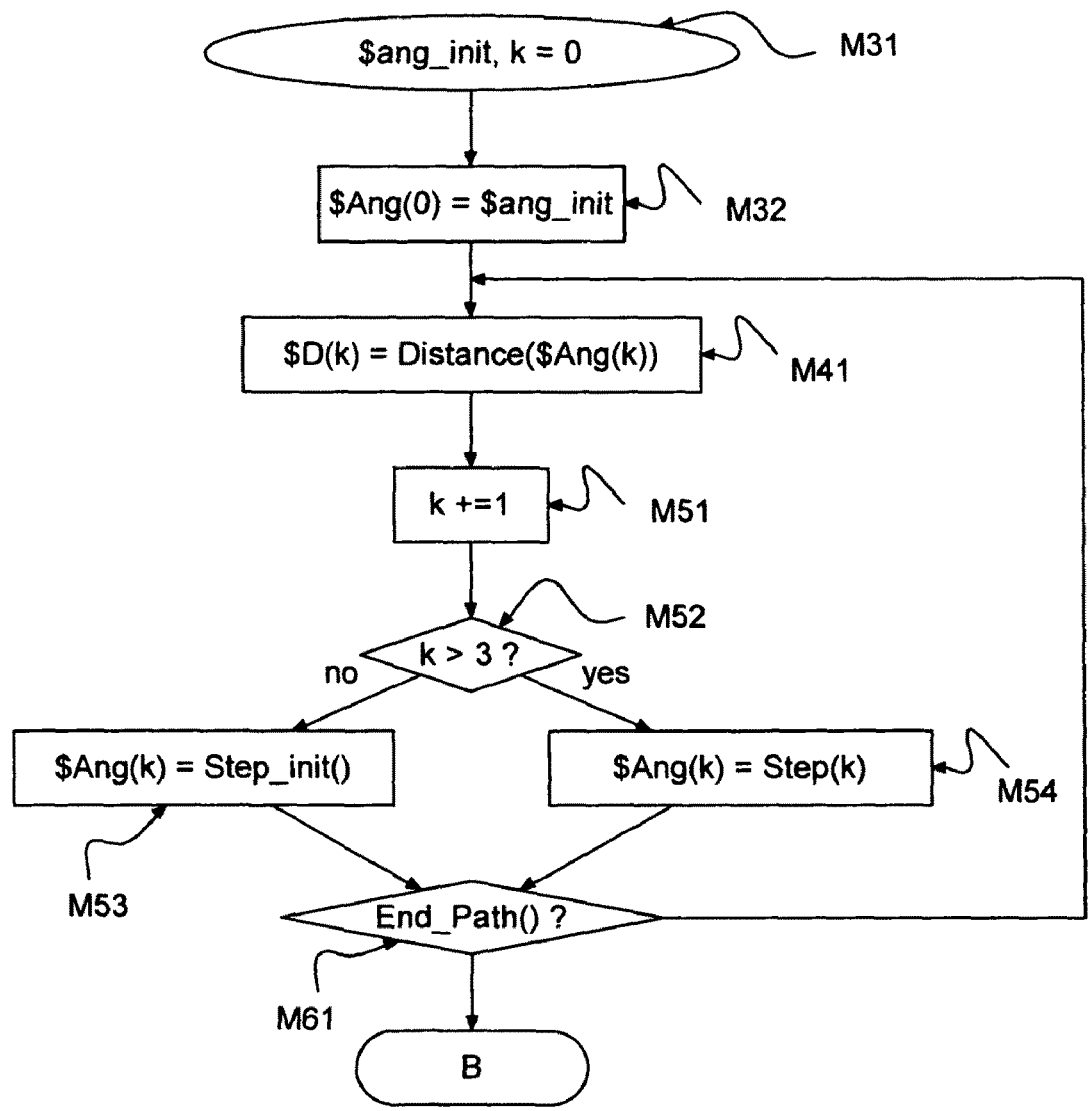
FIG. 4 shows an exemplary detailed flowchart of part of the method of FIG. 3.

FIG. 4 shows an exemplary flowchart of a part of FIG. 3. More precisely, it may detail operations M3 through M6, i.e. the "local" loop, prior to the review step.

This exemplary implementation of those operations may comprise the following operations:

M31. scanning parameters may be obtained, including index k set to 0 and a variable $ang_init which corresponds to the first orientation of the path.

M32. a first laser orientation $Ang(0) or $Ang(k) with k=0 may be initiated.

M41. a distance $D(k) for the k-th laser orientation may be set as the result of a function Distance( ). This function may use the laser orientation $Ang(k) as an argument, project the laser beam on the scene at an angle equal to $Ang(k) from the origin point of the scanning path, and return the measured distance to the scene as described earlier.

M51. index k may be increased.

M52. index k may be evaluated.

If k≦3,

M53. the laser orientation $Ang(k) for the k-th laser orientation may be set as the result of a function Step_init( ). This function may calculate an angular step from the sought for spatial resolution and the distances available, namely $D(0) to $D(2) and add that step to $Ang(k−1).

Else,

M54. the laser orientation $Ang(k) for the k-th laser orientation may be set as the result of a function Step(k). This function may perform a regression on the points deducted from the respective distances $D(k−3) to $D(k−1), and calculate a projected point. An orientation may then be calculated to aim at this projected point and be returned to define $Ang(k).

M61. a function End Path( ) may be executed, which checks whether $Ang(k) calculated at step M54 is within the scanning range or not.

If yes, then steps M41 to M61 are repeated with this orientation.

Else, the method proceeds to B, which is the starting point of the function Path_Review( ).

A variety of solutions may be implemented to calculate the next beam orientation from the prior ones. While the preferred embodiment uses two separate functions, a unique function could be used.

Alternative methods for calculating the next beam orientation may include using higher degree regressions, splines, or other suitable methods of calculation. Some alternative methods may predict the next beam orientation directly from the gained distances, rather 5 than extrapolations on the differences between distances gained at neighboring beam orientations.

Figure 5A:
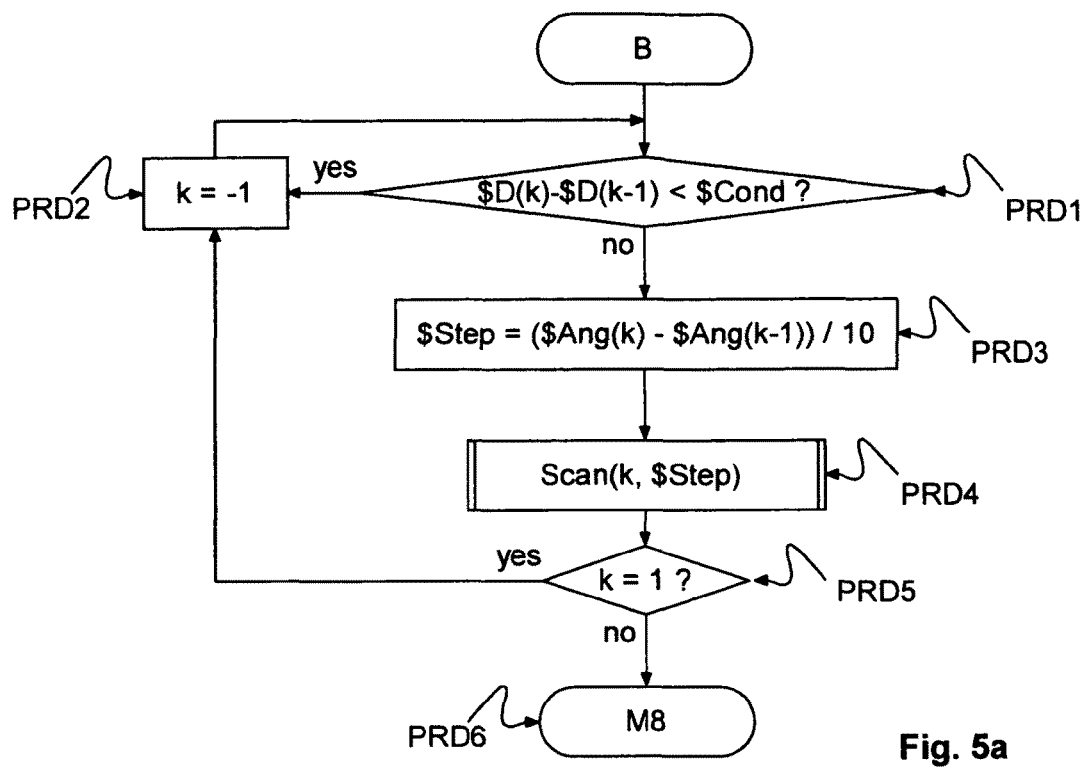
FIG. 5a and FIG. 5b show an exemplary detailed flowchart of another part of the method of FIG. 3.
Figure 5B:
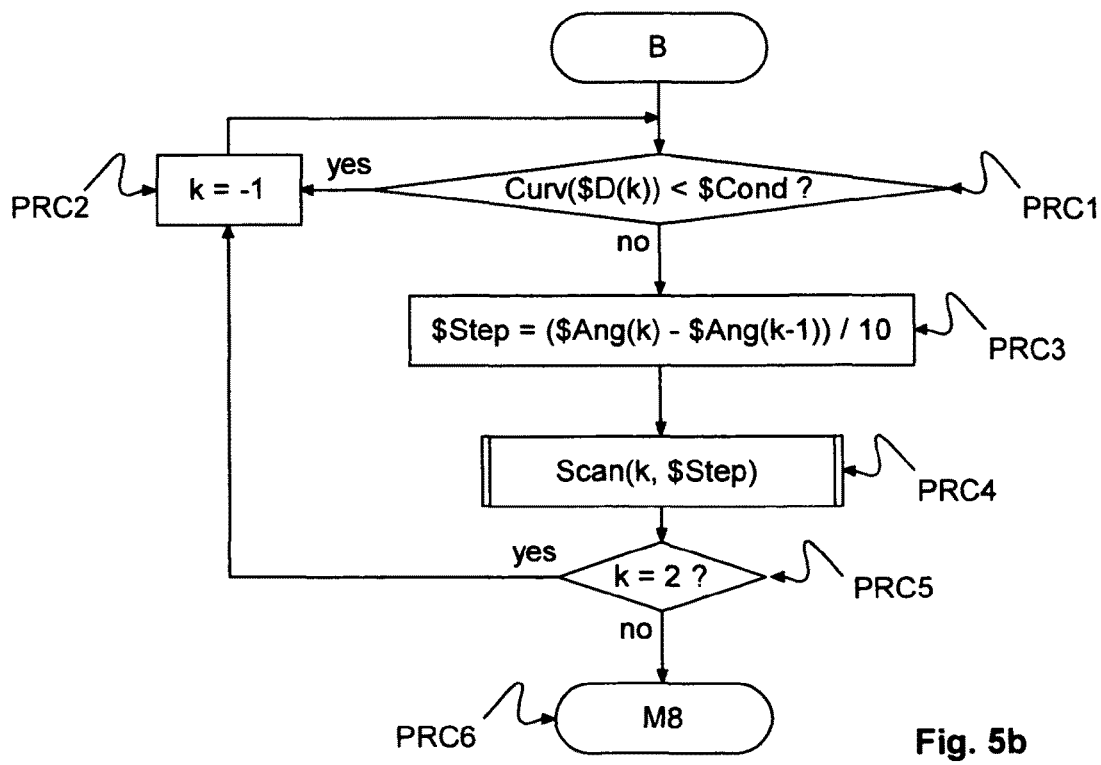

Function Path_Review( ) may comprise two separate subfunctions represented on FIGS. 5a and 5b, which are here operated simultaneously. They may however be operated sequentially.

FIG. 5a shows a method for detecting discontinuities in the path that has been scanned, and for scanning those discontinuities. It may comprise the following steps:

PRD1. a check for a discontinuity may be performed by comparing the k-th distance $D(k) to the scene to the (k−1)-th distance $D(k−1).

If this difference is small enough, e.g., inferior to a condition value $Cond, no discontinuity is detected. This difference may be seen as the local derivative of the distance to the scene along the path, and value $Cond as a lower limit to eliminate distance noise. It means that successive points are close enough to each other with respect to the global resolution.

When the difference exceeds $Cond, it indicates that the laser orientations corresponding respectively to index k−1 and index k correspond to points located at a significant distance of each other.

If a discontinuity is not detected, an operation PRD2 may be performed to decrease index k.

Else,

PRD3. an angle step $Step may be defined as the result the tenth of the angular difference between $Ang(k) and $Ang(k−1).

PRD4. a function Scan( ) may be performed. Function Scan( ) may use k and $Step as arguments. Function Scan( ) may perform a linear scan between the beam orientations $Ang(k) and $Ang(k−1), using $Step as an angular step. Function Scan( ) will be described hereinafter.

PRD5. index k is checked to see whether the whole scanning path has been reviewed.

Figure 7:
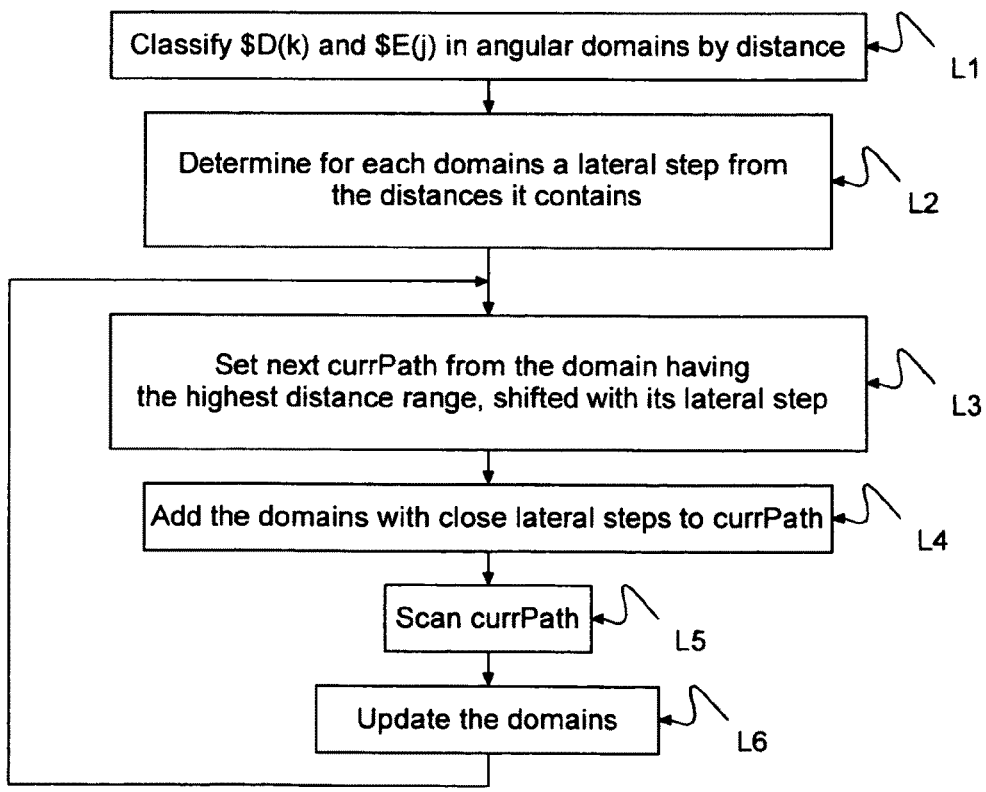
FIG. 7 shows an exemplary flowchart of part of the method of FIG. 3.

If yes,

PRD6. the next path is defined according to the method of FIG. 7.

Else, step PRD2 is executed to decrease index k, and steps PRD1 to PRD5 are repeated.

FIG. 5b shows a method for detecting curvature zones in the path that has been scanned, and for scanning those curvature zones. It may comprise the following steps:

PRC1. a check for a curvature zone may be performed by comparing the curvature shown at the k-th orientation to a given condition $Cond2. Thus curvature may be calculated from a function Curv( ), which may use k as an argument and return the curvature shown by the points corresponding to the distances $D(k) to $D(k−2). If this difference is small enough, e.g., inferior to the condition value $Cond2, no curvature zone is detected. Condition value $Cond2 ensures that scanned point correspond to the global resolution sought for.

When the difference exceeds $Cond2, it indicates that the laser orientations corresponding respectively to index k–2 to index k correspond to points located at a significant distance of each other.

If a discontinuity is not detected, an operation PRC2 may be performed to decrease index k.

Else,

PRC3. an angle step $Step may be defined as the result the twentieth of the angular difference between $Ang(k) and $Ang(k–2).

PRC4. a function Scan( ) may be performed. a function Scan( ) may be performed. Function Scan( ) may use k, 2 and $Step as arguments. Function Scan( ) may perform a linear scan between the beam orientations $Ang(k) and $Ang(k–2), using $Step as an angular step. Function Scan( ) will be described hereinafter.

PRC5. index k is checked to see whether the whole scanning path has been reviewed.

If yes,

PRC6. the next path is defined according to the method of FIG. 7.

Else, step PRC2 is executed to decrease index k, and steps PRC1 to PRC5 are repeated.

Some differences between the method of FIG. 5a and that of FIG. 5b may be noted:

in the method of FIG. 5a, a discontinuity is searched, which relates to steep changes in terms of direct distance between the scanned points, which allows to easily detect depth changes in the scanning;

in the method of FIG. 5b, a curvature zone is searched, which relates to the curvature shown by the scanned points, which allows to easily detect holes or bumps or other such irregularities in the shape of the scene.

The methods of FIGS. 5a and 5b may be run simultaneously, sequentially or separately. When run simultaneously or sequentially, the results of one of those methods may be used for the other method, e.g. function Scan( ) will not be run twice between two given orientations. Those methods could also be implemented differently, in order to take into account more orientations than shown here, to better detection.

Figure 6:
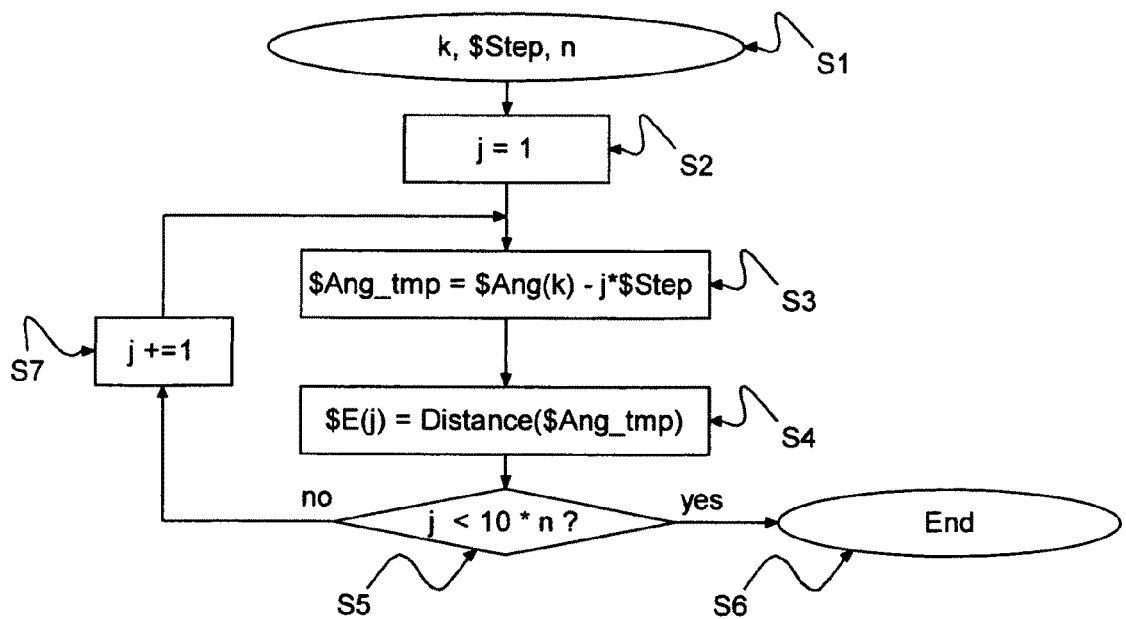
FIG. 6 shows an exemplary detailed flowchart of part of the method of FIGS. 5a and 5b.

FIG. 6 shows a simple implementation of function Scan( ). This function may comprise the following operations:

S1. receiving parameters k, n and $Step, which respectively indicate the orientations between which the linear scan is to be performed, and the resolution of this scan.

S2. defining an index j=1.

S3. defining a temporary orientation $Ang_tmp from $Ang(k) minus j times $Step.

S4. using function, Distance( ) to define a distance $E(j) from the temporary orientation $Ang_temp.

S5. index j may be checked to see whether all the orientations between $Ang(k) and $Ang(k–n) have been scanned.

If yes,

S6. distances $E(j) are returned.

Else,

S7. index j is increased, and steps S2 to S5 are repeated.

As can be seen from this figure, function Scan( ) is a function which scans at orientations between $Ang(k) and $Ang(k–n) at a linear resolution $Step.

Once the first full range has been scanned with the method described above, the following ranges are partly deduced from this scanning according to the method of FIG. 7, and individually scanned using the same method as the first full range.

As seen on FIG. 7, after step M7 has been performed on the first full range, the following operations may be performed to scan the rest of the scene:

L1. the obtained distances, i.e. $D(k) for those gained on the first pass and $E(j) for those gained during the path review may be classified in domains. More precisely, the first scanning path comprises points deduced from the distances gained at respective laser orientations. Those orientations form a first angular sector. Thus, the first angular sector may be divided in angular domains, each comprising at least one or more angular sectors containing beam orientations associated with similar distances. A given number of angular domains may thus be chosen to divide said first angular sector, wherein all distances gained about an angular sector of a given angular domain is within a given distance range. An example of the association of angular domains with respective distance ranges will be more apparent from FIG. 8a, which will be described further below.

L2. a lateral step may be deduced for each domain. This lateral step may represent an average angular step separating the orientations comprised in each domain. This lateral step will be used in much the same way the "predicted orientation" is used above. That is it represents a lateral deviation estimated for the orientations of each domain. While an average of the angular differences of successive orientations within each domain may be contemplated to calculate the lateral step, other formulas may be used, namely based on the distances associated with the orientations of each domain.

L3. the next path to be scanned may then be set. To do so, the domain having the highest distance range is selected, representing a portion of the first angular sector. This domain is then shifted laterally with an angular deviation equal to the lateral step of this domain, and the next path currPath is defined as this further angular sector.

L4. at this point, the path currPath is shifted by a global lateral deviation with respect to the first angular sector. Domains having lateral steps that are close to the global lateral deviation may then be added to the path currPath. That is, those domains may be shifted laterally with an angular deviation equal to the global lateral deviation, and included in the definition of currPath.

L5. path currPath may then be scanned and reviewed according to the above described method.

L6. according to the results of the scanning of path currPath, the domains may then be updated. Namely, the update of a domain may consist in rearranging angular sectors within a domain which show distances higher than the distance range of their current domain.

A comparison may also be performed with the previous paths, in order to reveal discrepancies. Those discrepancies may be for instance the discovery of a distance that substantially exceeds the distances of the highest distance range, or other discrepancies identified by the man skilled in the art. Where such a discrepancy is found, a full range scanning may be performed, at a lateral deviation equal to the global deviation from the first angular sector, and a domain update may follow this full range scanning.

After the domain update is done, steps L3 to L6 may be repeated until the last path of the scene has been scanned. Typically, if a given domain has lateral step comprised between two multiples of the lateral step of domains having a higher distance range, path currPath may be defined as this given domain, shifted laterally by a deviation equal to the lateral step of this given domain. The scanning of path curr-Path is then performed independently, between the respective scanning of the two domains having a higher distance range.

The methods described above enable fast and accurate scanning of a scene. In the examples described, those paths are generally sensibly vertical.

Figure 8A:
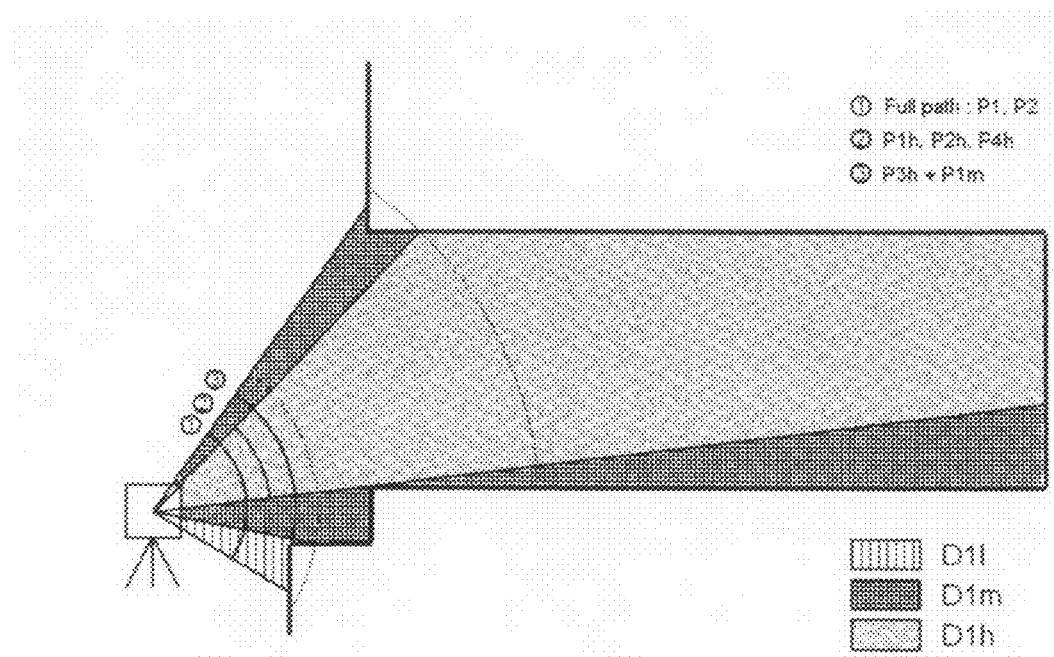
FIG. 8a shows an exemplary side view of a set of scanning paths and laser orientations used in the method of FIG. 7.
Figure 8B:
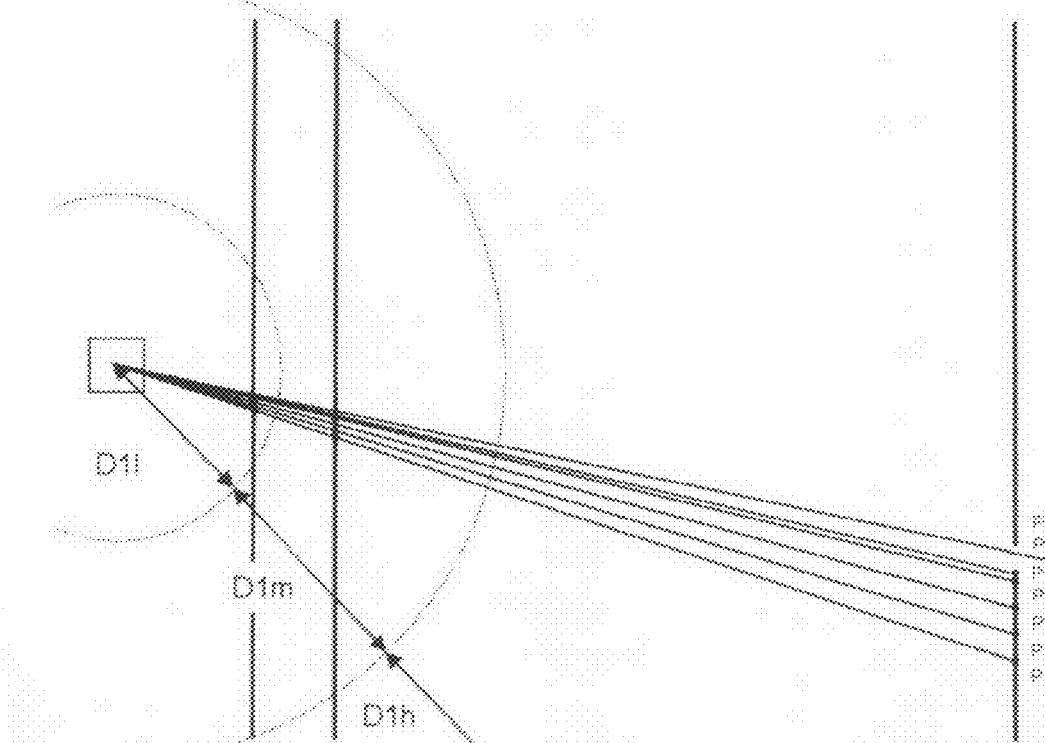
FIG. 8b shows an exemplary top view of a set of scanning paths and laser orientations used in the method of FIG. 7.

To illustrate the method of FIG. 7, an exemplary scanning is shown on FIGS. 8a and 8b. FIG. 8a is a side view of a scene scanned according to this method, and FIG. 8b a side view of the same scene.

On these figures, a plurality of paths P1, P1m, P1h, P2, P2h, P3h and P4h are shown. Path P1 is a full range scanning, and shows three domains D1h, D1m and D1l. Domain D1h has the highest distance range (the extremity of which is not shown on FIG. 8b, but is visible on FIG. 8a), domain D1l has the lowest distance range, and domain D1m has a distance range in the middle of the above. On FIGS. 8a and 8b, the distance ranges relative to each domain are made apparent by means of dotted arcuate portions. Paths P2h, P3h and P4h, which are substantially parallel and at a distance Ah of each other, represent domain D1h shifted laterally by an angular deviation equal to its lateral step, namely ΔPh.

shown, the discrepancy in path P4h is a "hole" in the background of the scene, which returns no measure.

accordingly, a full range scanning is performed on path P2, which corresponds to path P1 shifted laterally by a deviation equal to that of path P4h;

after the scan of path P2, domains are updated. In the example shown, the full range scanning of path P2 has shown that the discrepancy found in path P4h is a hole. This means there is no need for a new definition of the domains, and thus the domains remain unchanged; and the scanning of the rest of the scene is performed in the same way until the side end of the scene is reached.

For a better understanding of the domains, table 1 below shows exemplary distances gained about the paths of FIGS. 8a and 8b.

As appears in this table, domains D1l, D1m and D1h have been defined such that:

D1l={Positions where the measured distance is comprised in [0 m; 1 m[}

D1m={Positions where the measured distance is comprised in [1 m; 3 m[}

D1h={Positions where the measured distance is comprised in [3 m; 10 m[}

|  | P1 | | P1h | | ... | P3h + P1m | | P4h | | P2 | |
|---|---|---|---|---|---|---|---|---|---|---|---|
| θ | Distance | Domain | Distance | Domain | ... | Distance | Domain | Distance | Domain | Distance | Domain |
| $\theta_1$ | 2.9 | D1m | X | X | ... | 2.8 | D1m | X | X | 2.8 | D1m |
| $\theta_2$ | 3.5 | D1h | 3.4 | D1h | ... | 3.2 | D1h | 3.1 | D1h | 3.1 | D1h |
| $\theta_3$ | 4 | D1h | 3.9 | D1h | ... | 3.7 | D1h | 3.6 | D1h | 3.6 | D1h |
| $\theta_4$ | 5 | D1h | 4.9 | D1h | ... | 4.7 | D1h | ? | ? | ? | D1h |
| $\theta_5$ | 6 | D1h | 5.9 | D1h | ... | 5.7 | D1h | ? | ? | ? | D1h |
| $\theta_6$ | 8 | D1h | 7.9 | D1h | ... | 7.7 | D1h | 7.6 | D1h | 7.6 | D1h |
| $\theta_7$ | 8 | D1h | 7.9 | D1h | ... | 7.7 | D1h | 7.6 | D1h | 7.6 | D1h |
| $\theta_8$ | 2.5 | D1m | X | X | ... | 2.4 | D1m | X | X | 2.4 | D1m |
| $\theta_9$ | 1.5 | D1m | X | X | ... | 1.4 | D1m | X | X | 1.4 | D1m |
| $\theta_{10}$ | 0.5 | D1l | X | X | ... | X | X | X | X | 0.5 | D1l |

Path P1m is analogous to path P1h, with domain D1m, step Δm and lateral step ΔPm in lieu of domain D1h, step Δh, and lateral step ΔPh. As the scanning is carried on, there would also be a path P1l associated to a distance Δl and a lateral step ΔP1. However, this path is not shown in order to facilitate the understanding of this example.

Path P2 represents another full range scanning, due to a discontinuity, which will described in further detail below.

The method of FIG. 7 may be executed as follows:

path P1 is scanned and reviewed according to the methods of FIGS. 4 to 6;

the resulting distances are classified in the three domains D1h, D1m and D1l and corresponding lateral steps Δh, Δm and Δl may be calculated;

path P1h is defined from domain D1h, and scanned and reviewed according to the methods of FIGS. 4 to 6;

domains D1h, D1m and D1l are updated, without change since no orientation within path P1h shows a difference;

path P2h is scanned and reviewed like path P1h;

path P3h is then supposed to be scanned. However, adjoining path P1m is scanned and reviewed simultaneously in order to increase the scanning speed. This simultaneous scanning is optional and both paths P3h and P1m could be scanned separately;

path P4h is scanned and reviewed like path P2h;

during the update of the domains following the review of path P4h, a discrepancy is detected. In the example It is clear from table 1 that angular positions of a given domain are not necessarily neighboring positions. For instance, domain D1m comprises three angular positions, θ1, θ8 and θ9.

Table 1 also shows how a given scanning path contains only distances measured at positions within the domain it concerns. The classification of the results for the update of the domains is further shown, along with the case of a discrepancy with the full range scanning of path P2.

The choice to integrate all or part of the embodiment being described hereinbefore may depend upon the capabilities of the scanning light source and/or of the hardware/software assembly processing the light returns.

The example described herein is to be interpreted in a non restrictive manner, and the scope of the invention encompasses all alternatives accessible to those skilled in the art.

A variety of alternative embodiments may be contemplated:

it would also be possible to monitor the distances gained along the paths, so that part of the reviewing step may be done while scanning, and the scanning part of the reviewing step be operated as soon as possible, the distances of corresponding laser orientations along two consecutive paths could also be compared. This comparison could be used to detect "transverse" discontinuities, i.e. discontinuities in a direction transverse to that of the paths. These discontinuities could be scanned to offer an even better image quality.

As mentioned above, the paths are generally vertical, and start from the ground (or a given angle) on up. However, the paths could start from ceiling (or a given angle) on down. They could also be generally horizontal and start from left to right or from right to left. Furthermore, the method and device described herein make use of a laser to calculate the distances. However, any light beam offering comparable precision and/or measurability could be used.

The above described method is implemented by software code. The controller in the above described example comprises software code. However, it could also be implemented as on-board circuitry, at least partially, by means of an FPGA circuitry or of an ASIC circuitry for instance.

This invention also covers the corresponding software code itself, especially when made available on any appropriate computer-readable medium. The expression "computer-readable medium" includes a storage medium such as magnetic or optic, as well as a transmission medium such as a digital or analog signal. In the present case, the software code may basically include the "matching function", and/or the "controller", as well as code adapted to perform the same functions, while relying on appropriate middleware.

What is claimed is:

1. A method of completely scanning a whole scene, said method comprising:
   a. sending a light beam to the scene according to a beam orientation, and gaining distance information from the return of said light beam,
   b. selectively repeating step a. with a plurality of other beam orientations in one complete scanning of the whole scene wherein step b. comprises:
   b1. after one or more repetitions of step a. defining the next beam orientation to be used in the one complete scanning of the whole scene using distance information gained at one or more preceding beam orientations of the one complete scanning.

2. The method of claim 1, wherein step b1. comprises defining the next beam orientation by performing a regression on said preceding beam orientations and the corresponding distance information.

3. The method of claim 1, further comprising the step of:
   c. conditionally and selectively repeating step a. with closer beam orientations, where a variation in the distance information gained at neighboring beam orientations meets a predefined rule.

4. The method of claim 3, wherein step c. comprises:
   c1. determining beam orientations between which said variation substantially exceeds a first threshold.

5. The method of claim 3, wherein step c. comprises:
   c2. determining beam orientations between which said variation shows a curvature which substantially exceeds a second threshold.

6. The method of claim 1, in which the beam orientations of steps a. and b. form a first angular sector, said method further comprising the step of:
   d. selectively repeating steps a. and b. at further beam orientations, said further beam orientations forming a further angular sector derived from a selected portion of said first angular sector, with a lateral shift related to the angular deviations between the beam orientations in said portion of said first angular sector.

7. The method of claim 6, further comprising the step of:
   e. updating said portion of said first angular sector, based on distance information gained through the execution of step d.

8. The method of claim 6, further comprising the step of:
   f. responsive to discrepancies in the distance information gained through the execution of step d., resetting said further angular sector to be said first angular sector, with a selected lateral shift.

9. The method of claim 1, wherein steps a. and b. are reiterated with progressive lateral shifts to encompass a selected portion of the scene.

10. The method of claim 9, wherein the beam orientations of steps a. and b. are organized in scan lines, at a lateral angular deviation from each other.

11. The method of claim 1, wherein the light beam is a laser beam.

12. A scanning device, comprising:
    a controllable light beam scanning device capable of scanning a light beam onto a scene, and of receiving corresponding light returns from the scene,
    a controller capable of operating said scanning device at selected beam orientations, and gaining distance information from said scanning device at said beam orientations in one complete scanning of the whole scene wherein the controller is further capable of dynamically defining a further beam orientation to be used in the one complete scanning of the whole scene using distance information gained at preceding beam orientations of the one scanning.

13. A scanning device according to claim 12, wherein the controller is capable of defining said further beam orientation from a regression over said preceding beam orientations and the corresponding distance information.

14. A scanning device according to claim 12, wherein said controller is further capable of monitoring the distance information gained at neighboring beam orientations, and of operating again said scanning device with closer beam orientations where the variation in the distance information being monitored meets a predefined rule.

15. A scanning device according to claim 14, wherein said predefined rule comprises the fact that the variation in the distance information gained at successive beam orientations exceeds a first threshold.

16. A scanning device according to claim 14, wherein said predefined rule comprises the fact that the curvature shown by the variation in the distance information gained at neighboring beam orientations exceeds a second threshold.

17. A scanning device according to claim 12, wherein the controller is capable of operating said scanning device at selected beam orientations forming a first angular sector, and of thereafter operating said scanning device at other beam orientations belonging to at least one further angular sector, such a further angular sector being derived from a selected portion of said first angular sector, with a lateral shift being related to the spreading of the beam orientations in said portion of said first angular sector.

18. A scanning device according to claim 17, wherein said portion of said first angular sector is selected to contain beam orientations whose distance information belongs to a selected distance range.

19. A scanning device according to claim 18, wherein said controller is arranged for deriving said lateral shift from said selected distance range.

20. A scanning device according to claim 18, wherein a first one of said further angular sectors corresponds to a first portion of said first angular sector being selected to contain beam orientations whose distance information belongs to a higher distance range.

21. A scanning device according to claim 18, wherein a subsequent further angular sector corresponds to a portion of said first angular sector being selected to contain beam orientations whose distance information belongs to a less higher distance range.

22. A scanning device according to claim 17, wherein said controller is further capable of updating said portion of said first angular sector based on distance information gained over a further angular sector.

23. A scanning device according to claim 17, wherein, responsive to discrepancies in the distance information gained over a given further angular sector, said controller is further capable of operating said scanning device over an angular sector having substantially the same extent as said first angular sector, with a selected lateral shift.

24. A scanning device according to claim 12, wherein the light beam is a laser beam.

25. A controller which performs the steps of claim 1.

26. A computer-readable medium tangibly embodying instructions which a machine executes to implement the controller as claimed in claim 12.

27. A program storage device readable by a machine, tangibly embodying instructions which the machine executes to perform the steps of claim 1.

28. A computer-readable medium tangibly embodying instructions which the machine executes to perform the steps of claim 1.

* * * * *